United States Patent [19]

Bartmann et al.

[11] Patent Number: 4,687,834
[45] Date of Patent: Aug. 18, 1987

[54] POLYESTER IMIDES AND METHOD FOR PRODUCING SAME

[75] Inventors: Martin Bartmann, Recklinghausen; Wolfgang Seeliger, Marl, both of Fed. Rep. of Germany

[73] Assignee: Hüls Aktiengesellschaft, Marl, Fed. Rep. of Germany

[21] Appl. No.: 888,039

[22] Filed: Jul. 22, 1986

[30] Foreign Application Priority Data

Oct. 19, 1985 [DE] Fed. Rep. of Germany ....... 3537230

[51] Int. Cl.⁴ ..................... C08G 69/44; C08G 69/08
[52] U.S. Cl. .................................. 528/291; 528/292; 528/296
[58] Field of Search .................... 528/291, 292, 296

[56] References Cited

U.S. PATENT DOCUMENTS 4,390,686  6/1983  Janssen et al. .................. 528/289
4,552,950 11/1985  McCready ...................... 528/292
4,556,705 12/1985  McCready ...................... 528/289

Primary Examiner—Lucille M. Phynes
Attorney, Agent, or Firm—Oblon, Fisher, Spivak, McClelland, & Maier

[57] ABSTRACT

The invention relates to a method of producing polyester imides of the formula

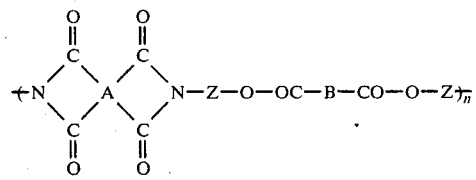

by reacting tetracarboxylic acid dianhydrides of the formula

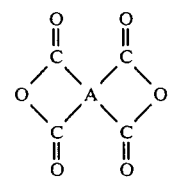

with N,N'-bis(Ω-hydroxyalkyl)dicarboxylic acid diamides of the formula, HO—Z—NH—CO—B—CO—NH—Z—OH, where A represents a quadrivalent aromatic group with 6–32 C atoms, wherein up to 40% of A may be replaced by a quadrivalent aliphatic group with up to 16 C atoms, B represents a divalent aliphatic or aromatic group with up to 14 C atoms, Z represents an alkylene group with 2–3 C atoms, and n is a number from 3 to 500.

21 Claims, No Drawings

POLYESTER IMIDES AND METHOD FOR PRODUCING SAME

BACKGROUND OF THE INVENTION

1. Field of the Invention

The polyester imides of general formula I in which A is a quadrivalent aromatic group with 6-32 C atoms, in which up to 40% of A may be replaced by a quadrivalent aliphatic group with up to 16 C atoms, B is a divalent aliphatic or aromatic group with up to 14 C atoms, Z is an alkylene group with 2-3 C atoms, and n is a number from 3-500, are of high industrial interest due to their high thermal stability and the favorable combination of polyester and polyester imide properties.

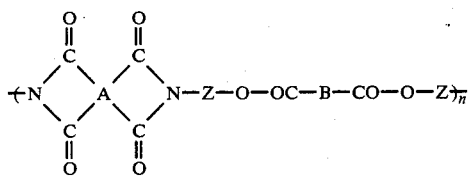
(I)

However, an attractive method for preparing polymers of this class has been lacking. Accordingly, the applications of polyester imides of formula I have been limited to small scale research quantities.

2. Discussion of the Background

In Jap. Pat. App. OS No. 84/120,632, a three-stage method for preparing polyester imides of formula VIII is described.

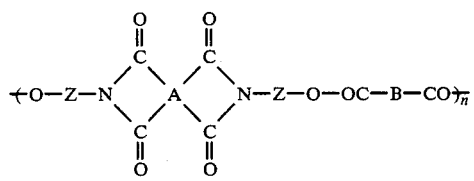
(VIII)

According to this method, a tetracarboxylic acid dianhydride of formula II is first reacted with an

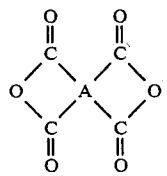
(II)

amino alcohol of formula IV, to produce the corresponding diamidedicarboxylic acid (V).

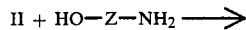

II + HO—Z—NH$_2$ ⟶
(IV)

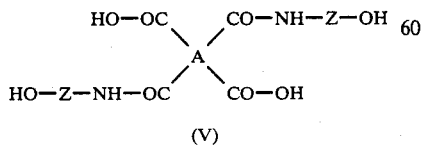
(V)

This is then condensed with dicarboxylic acid dichlorides (VI) to produce polyamide carboxylic acid esters of general formula VII, and in a third step the polyamide esters are dehydrated to form polyester imides of formula VIII.

V + Cl—CO—B—CO—Cl ⟶
(VI)

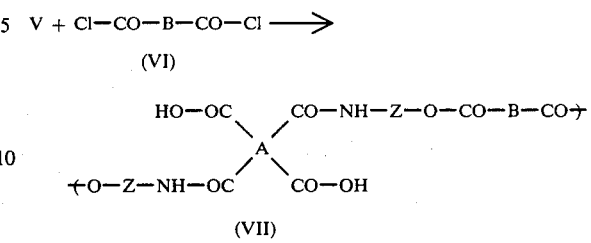
(VII)

This method is costly, not only because it requires three steps, but because it uses dicarboxylic acid dichlorides, which are difficult to handle. Furthermore, a number of interfering side reactions are possible, and the only way to suppress these reactions to any substantial degree is to adhere stringently to specific reaction conditions. The acid dichlorides present a particular problem in that the product itself can be damaged by formation of HCl.

It is also known from Ger. OS No. 12 57 778 to produce N-2-acyloxyethylphthalimides of general formula X, where R represents a hydrogen atom, an alkyl group, or a phenyl group, by reacting phthalic anhydride with N-2-hydroxyethylcarboxamides of general formula IX.

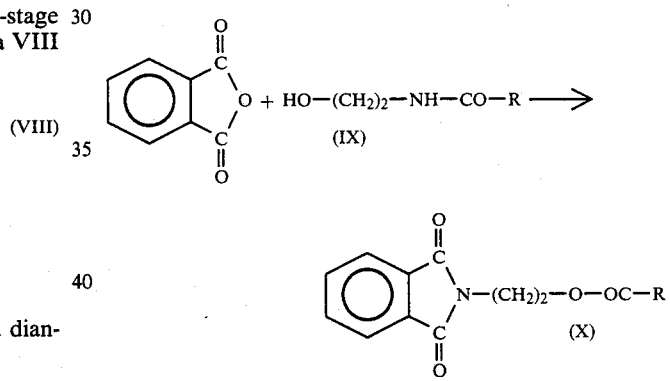

It is surprising to one skilled in the art that the primary amide bond in this case is so easily broken, and forms the structure with a secondary amide and an ester adjoining each other. It would not be expected that an amide rearrangement reaction (transamidation) could be carried out so easily on difunctional compounds such as III, because this would require a completely unitary, i.e., one-stage course of reaction.

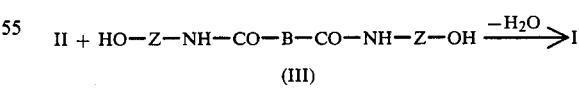

SUMMARY OF THE INVENTION

Accordingly, one object of the present invention is to provide novel polyester imides of general formula I.

Another object of the invention is to provide a method for producing polyester imides of general formula I by reacting tetracarboxylic acid dianhydrides of formula II with N,N'-bis(Ω-hydroxyalkyl)dicarboxylic acid diamides of formula III with removal of the water of reaction which is formed.

A further object of the invention is to provide a method for producing novel polyester imides of general formula I by reacting compounds having general formulas II and III with removal of the water of reaction which is formed and maintaining the reaction temperature between 150°–300° C. toward the end of the reaction.

Still another object of the invention is to provide a method for producing polyester imides of general formula I which utilizes a catalyst, a protective gas atmosphere, polar aprotic solvents or mixture of polar aprotic solvents with nonpolar organic solvents, and in which the polymer is isolated by precipitation.

Surprisingly, it has been discovered in connection with the present invention, that polyester imides of formula I can be produced by reacting tetracarboxylic acid dianhydrides of formula II with N,N'-bis(Ω-hydroxyalkyl)dicarboxylic acid diamides of formula III. Crucial factors are that the water of reaction formed is removed, and that the reaction is carried out—at least near the point of completion—at a temperature between 150° and 300° C. Additionally, it is preferable to utilize a catalyst, a protective gas atmosphere, and a polar reaction medium comprised of polar aprotic solvents or their mixtures with nonpolar organic solvents. It is also preferable that the polymer produced by the method be isolated by precipitation and addition of an antisolvent. But it is also possible to use direct-isolation methods like spray-drying or evaporation of solvents.

DETAILED DESCRIPTION OF THE PREFERRED EMBODIMENTS

Suitable tetracarboxylic acid dianhydrides (II) are aromatic compounds with two anhydride groups, e.g. derivatives of benzene, benzophenone, biphenyl, diphenyl ether, and bisphenol A. Preferred anhydrides are:

Pyromeliitic acid dianhydride;
3,3', 4,4'-Benzophenonetetracarboxylic acid dianhydride;
3,3',4,4'-Biphenyltetracarboxylic acid dianhydride;
3,3',4,4'-Diphenyl ether tetracarboxylic acid dianhydride;
2,2-Bis[4-(3,4-dicarboxyphenoxy)phenyl]propane dianhydride;
4,4-Bis(3,4-dicarboxyphenoxy)diphenyl sulfide dianhydride;
and mixtures of these. Up to 40% of these aromatic anhydrides may be replaced by aliphatic tetracarboxylic acid dianhydrides with up to 12 C atoms. Examples of such aliphatic compounds are 1,2,3,4-butanetetracarboxylic acid dianhydride and cyclopentanetetracarboxylic acid dianhydride.

Suitable N,N'-bis(Ω-hydroxyalkyl)dicarboxylic acid diamides (III) include diamides with the alkylene group having 2–3 C atoms. The dicarboxylic acid on which the structure is based may be of either an aliphatic or aromatic nature, and may contain up to 16 C atoms.

The preferred diamides are:
N,N'-Bis(2-hydroxyethyl)isophthalic acid diamide;
N,N'-Bis(2-hydroxyethyl)terephthalic acid diamide;
N,N'-Bis(3-hydroxypropyl)isophthalic acid diamide;
N,N'-Bis(2-hydroxyethyl)adipic acid diamide;
N,N'-Bis(3-hydroxypropyl)adipic acid diamide;
N,N'-Bis(2-hydroxyethyl)decanedicarboxylic acid diamide;
N,N'-Bis(2-hydroxyethyl)-5-tert.-butylisophthalic acid diamide;
and mixtures of these. The diamides can be easily prepared by reacting the corresponding dicarboxylic acids or their esters with alkanolamines. An example of the preparation of a diamide is given in the Examples section below.

The reaction of the diamides III with the anhydrides IV is carried out in a polar reaction medium at temperatures up to 300° C., preferably with concentrations of solids being 5–50 wt. %.

The reaction medium used comprises aprotic solvents such as, e.g., dimethyl sulfoxide (DMSO), tetrahydrothiophene dioxide (sulfolan), nitrobenzene, N-methylpyrrolidone (NMP), dimethylacetamide (DMA), or diphenyl sulfone, or mixtures of these with nonpolar organic solvents such as toluene, xylene, chlorobenzene, dichlorobenzene, anisole, and diphenyl ether, with the nonpolar organic solvents being present in the proportion of at most 80 wt. %.

The mechanism of the novel polymer-formation reaction has not been elucidated in detail. Under special conditions (see below), isolatable preliminary polymer stages have been found which contain amide, ester, and acid functions. This suggests that products of formula I form primarily by reaction of the OH group of the hydroxyalkylamide with the anhydride group, followed by a surprising major intermolecular rearrangement with elimination of water.

One may conduct the reaction at temperatures between 150° and 300° C., or one may begin at lower temperatures, i.e., 20°–150° C., and heat the reaction mixture above 150° C. toward the end of the reaction.

If the reaction between the anhydrides II and the diamides III is carried out in solution at temperatures between 20° and 150° C., preferably between 50° and 120° C., one first obtains polymers with amide, ester, and acid functions. It is possible to precipitate and isolate these polymers by adding an antisolvent. In a second step, these polymers, in solid form or in solution, are converted to polyester imides of formula I by increasing the reaction temperature to between 150° and 300° C., preferably between 170 and 270° C.

If the compounds of formulas II and III are reacted at temperatures between 150° and 300° C., preferably between 170° and 270° C., in a single step, solutions of the polyester imides of formula I are produced directly. Reaction times are 1–12 hr, as a rule.

To produce high molecular weight products it is necessary that the water formed in the reaction be removed from the reaction mixture. There are various possible means to accomplish the removal of the water. Thus, for example, an inert gas such as nitrogen or argon may be passed through or over the reaction medium. Alternatively, a vacuum may be applied and/or a part of the solvent along with the water may be removed by azeotropic distillation.

The reaction may be carried out in the presence of catalysts. Two types of catalysts which are candidates for use are:

1. Compounds capable of catalyzing the reaction of alcohols with anhydrides; for example:
    Acids, such as sulfuric acid, methanesulfonic acid, and toluenesulfonic acid;
    Bases, such as triethylamine, pyridine, and 4-dialkylaminopyridines;
    Metal compounds, such as tin, tin oxide (stannic oxide), dibutyltin oxide, zinc chloride, zinc acetate, and sodium acetate.

2. Compounds capable of catalyzing the imidization of carboxamides, e.g. triethylamine, triethylamine together with dicarboxylic acid anhydrides, a mixture of pyridine and a dicarboxylic acid anhydride, or a mixture of an alkali acetate and acetic anhydride.

At the end of the polymer formation reaction, there results a more or less viscous solution or a suspension of the polymers in the solvent or solvent mixture employed. The isolation technique for the polyester imides is not critical. The products may be sent directly to further processing (e.g. manufacture of coatings), or they may be precipitated out after dilution, by addition of antisolvents.

Antisolvents which may be used are lower alcohols (e.g., methanol, ethanol, or isopropanol), ketones (e.g., acetone or methyl ethyl ketone), or water, or mixtures of these.

Other features of this invention will become apparent in the course of the following descriptions of exemplary embodiments which are given for illustration of the invention and are not intended to be limiting thereof.

EXAMPLES

A. Preparation of N,N'-bis(2-hydroxyethyl) terephthalic acid diamide

Example 1

Starting Materials:
97.1 g terephthalic acid dimethyl ester;
64.13 g ethanolamine.
Procedure:
The mixture of starting materials was heated at 120° C. in a stirred 2-liter round-bottom flask. A clear molten mass formed, with evolution of methanol. With further heating to 150° C., this mass hardened. After 30 min, a vacuum of 30 mbar was applied, and maintained for 60 min to remove the readily volatile components of the reaction mixture. The residue was recrystallized from 1.5 liters water.
Yield: 119 g (90% of theoretical).
Melting point: 232° C.

B. Preparation of the polyester imide I

Example 2

Starting Materials:
18.2 g N,N'-bis(2-hydroxyethyl)isophthalic acid diamide (BHID);
15.75 g pyromellitic acid dianhydride (PMDA);
150 g sulfolan;
30 g chlorobenzene.
Procedure:
The BHID was dissolved in 20 g sulfolan and was charged into a stirred flask with a nitrogen inlet and a distillation head, while nitrogen was passed through (20 liter/hr) at 165° C. A solution of PMDA in a mixture of the chlorobenzene and the remainder of the sulfolan were added dropwise over 60 min, while continuing the nitrogen flow. After this addition had been completed, the interior temperature was increased to 185° C. and the reaction was allowed to proceed 6 hr. During the PMDA addition and the reaction period at 185° C., the distillation of the chlorobenzene/water azeotrope was monitored, until pure chlorobenzene finally passed over.

After conclusion of the polycondensation, the cooled reaction mixture was poured into 300 ml methanol. The precipitate was separated out by suction filtration, washed with methanol, and then vacuum dried at 100° C.
Yield: 28.8 g.
$M_n$: 6,500 (by GPC analysis).
$M_w$: 20,000 (by GPC analysis).
IR spectrum (cm$^{-1}$): 1,780 and 1,725 (imide +ester), 1,390, 1,370, 1,235, and 730.

Example 3

Starting Materials:
19.1 g BHID;
15.75 g PMDA;
120 g sulfolan;
30 g chlorobenzene.
Procedure:
A solution of the BHID in the sulfolan and chlorobenzene was heated to 165° C. under nitrogen, and solid PMDA was added to this in portions over 2 hr. After the conclusion of the PMDA addition, the reaction temperature was increased to 185° C. and the mixture was allowed to react 4 hr. The workup was analogous to that in Example 1.
Yield: 29.2 g.
$M_n$: 11,500 (by GPC analysis).
$M_w$: 35,100 (by GPC analysis).
IR spectrum (cm$^{-1}$): same as in Example 1.

Example 4

Starting Materials:
18.2 g BHID;
15.75 g PMDA;
150 g nitrobenzene.
Procedure:
The PMDA, dissolved in nitrobenzene, was added dropwise over 60 min to the BHID melt stirred at 220° C. under nitrogen. The mixture was allowed to react further at 220° C. for 2 hr. The workup was analogous to that in Example 1.
Yield: 29.1 g.
$M_n$: 13,100 (by GPC analysis).
$M_w$: 40,600 (by GPC analysis).
IR spectrum (cm$^{-1}$): same as in Example 1.

Example 5

Starting Materials:
18.2 g BHID;
15.75 g PMDA;
135 g diphenyl sulfone;
15 g diphenyl ether.
Procedure:
The PMDA was added in portions over 60 min to a mixture of the BHID, diphenyl sulfone, and diphenyl ether, with stirring, at 250° C. under nitrogen. After allowing the mixture to react an additional 2 hr at the same temperature, the mixture was allowed to cool to 200° C., and was diluted with 200 g NMP. After cooling the mixture to room temperature, 500 g methanol was stirred in, the precipitate was separated by suction filtration, and the product was extracted with 500 g boiling acetone. After a second suction filtration, the product was washed with methanol and then vacuum dried.
Yield: 28.5 g.
$M_n$: 12,500 (by GPC analysis).
$M_w$: 38,700 (by GPC analysis).
Elemental analysis: Found: 60.5% C, 3.45% H, 29.2% O, 6.8% N. Calculated: 60.8% C, 3.2% H, 29.5% O, 6.5% N.
IR spectrum (cm$^{-1}$): same as in Example 1.

Example 6

Starting Materials:
12 g BHID;
7.1 g N,N'-bis(2-hydroxyethyl)terephthalic acid diamide (BHTD);
16.2 g PMDA;
310 g nitrobenzene.
Procedure:

A solution of PMDA in 120 g nitrobenzene was added dropwise over 60 min to a mixture of the BHID and BHTD in 190 g nitrobenzene with stirring at 220° C. under nitrogen. 130 ml of distillate passed over. The reaction temperature was then reduced to 200° C., and the mixture was allowed to react for an additional 4 hr. The workup was analogous to that in Example 1.

Yield: 29.4 g.
$M_n$: 11,300 (by GPC analysis).
$M_w$: 36,100 (by GPC analysis).
IR spectrum ($cm^{-1}$): 1,780 and 1,725 (imide +ester), 1,390, 1,375, 1,280, 1,240, 745, and 715.

Example 7

Starting Materials:
9.1 g BHID;
7.9 g PMDA;
100 g sulfolan.
Procedure:

Solid PMDA was added in portions over 120 min to a solution of the BHID in the sulfolan with stirring at 80° C., while nitrogen was passed through at 20 liter/hr. After the addition and 4 hr subsequent reaction at the same temperature, a highly viscous mass remained. A sample isolated by precipitation indicated formation of a polymer with amide, ester, and acid functions. No imide groups were detectable. The reaction mixture was then heated to 200° C. and stirring was continued for 4 hr at this temperature. The workup was analogous to that in Example 1.

Yield: 14.3 g.
$M_n$: 9,400 (by GPC analysis).
$M_w$: 29,800 (by GPC analysis).
IR spectrum ($cm^{-1}$): same as in Example 1.

Example 8

Starting Materials:
9.1 g BHID;
7.9 g PMDA;
0.05 g 4-dimethylaminopyridine;
100 g sulfolan.
Procedure:

The same procedure was used as in Example 6. After completion of the PMDA addition, the viscosity of the reaction mixture had already increased sharply. A sample isolated by precipitation indicated formation of a polymer with amide, ester, and acid functions. No imide groups were detectable. The reaction mixture was then heated to 200° C. and stirring was continued 4 hr at this temperature. The workup was analogous to that in Example 1.

Yield: 14.5 g.
$M_n$: 10,800 (by GPC analysis).
$M_w$: 31,200 (by GPC analysis).
IR spectrum ($cm^{-1}$): same as in Example 1.

Example 9

Starting Materials:
18.2 g BHTD;
37.4 g 2,2-bis[4-(3,4-dicarboxyphenoxy) phenyl]propane dianhydride;
200 g sulfolan;
30 g chlorobenzene.
Procedure:

As in Example 1.
Yield: 49.3 g.
$M_n$: 15,700 (by GPC analysis).
$M_w$: 54,900 (by GPC analysis).
IR spectrum ($cm^{-1}$): 1,775 and 1,725 (imide +ester).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for producing polyester imides of the general formula

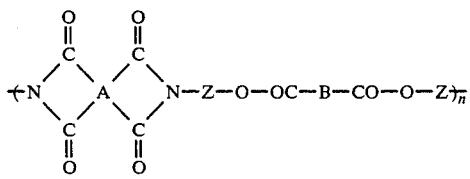

comprising the steps of:
(i) reacting a tetracarboxylic acid dianhydride of the formula

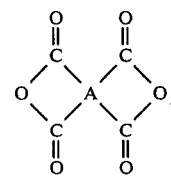

with a N,N'-bis (Ω-hydroxyalkyl) dicarboxylic acid diamide of the formula, HO—Z—NH—CO—B—CO—NH—Z—OH, and
(ii) removing the water of reaction formed;
wherein A is a quadrivalent aromatic group with 6-32 C atoms, wherein up to 40% of A may be replaced by a quadrivalent aliphatic group with up to 16 C atoms,
B is a divalent aliphatic or aromatic group with up to 14 C atoms,
Z is an alkylene group with 2-3 C atoms, and
n is a number from 3 to 500; and
wherein the reaction temperature is between 150° and 300° C. at the end of the reaction.

2. The method of claim 1, wherein n is from 10 to 200.

3. The method of claim 1, wherein said dianhydride and said diamide are initially reacted at a first temperature which is less than 150° C., and then the reaction temperature is increased to a second temperature which is greater than 150° C., with removal of the water which forms.

4. The method of claim 3, wherein said first temperature is about 50°–120° C. and wherein said second temperature is about 170°–300° C.

5. The method of claim 1, wherein said reacting and said removing steps are carried out at above 150° C.

6. The method of claim 5, wherein said reacting and said removing steps are carried out at about 170°–300° C.

7. The method of claim 1, wherein said reacting and said removing steps are carried out in the presence of a catalyst.

8. The method of claim 7, wherein said catalyst is an acid, a base, a metal compound or a compound capable of catalyzing the imidization of a carboxamide.

9. The method of claim 8, wherein said acid is sulfuric acid, methanesulfonic acid or toluenesulfonic acid.

10. The method of claim 8, wherein said base is triethylamine, pyridine or 4-dialkylaminopyridines.

11. The method of claim 8, wherein said metal compound is tin, tin oxide, dibutyl tin oxide, zinc chloride, zinc acetate or sodium acetate.

12. The method of claim 8, wherein said compound capable of catalyzing the imidization of a carboxamide is a mixture of triethylamine and a dicarboxylic acid anhydride, a mixture of pyridine and a dicarboxylic acid anhydride or a mixture of an alkali acetate and acetic anhydride.

13. The method of claim 1, wherein said dianhydride is pyromellitic acid dianhydride.

14. The method of claim 1, wherein said diamide is N,N'-bis(2-hydroxyethyl)isophthalic acid diamide, N,N'-bis(2-hydroxyethyl)terephthalic acid diamide or a mixture of these.

15. The method of claim 1, wherein said reacting and said removing steps are carried out under a protective gas.

16. The method of claim 15, wherein said protective gas is nitrogen or argon.

17. The method of claim 1, wherein said reacting and said removing steps are carried out in a polar reaction medium comprised of a polar aprotic solvent or a mixture of said aprotic solvent with at least one nonpolar organic solvent, wherein the proportion of said nonpolar solvent is at most 80 wt. %.

18. The method of claim 1, wherein said isolating step is comprised of precipitating said polyester imide and adding an antisolvent.

19. The method of claim 18, wherein said antisolvent is methanol or ethanol.

20. Polyester imides which are produced by the method of claim 1.

21. The polyester imides of claim 20, wherein said polyester imides have an Mn value from about 6500 to about 15,700, and an Mw from about 20,000 to about 54,900.

* * * * *